USOO5887858A

United States Patent [19]
Su

[11] Patent Number: 5,887,858
[45] Date of Patent: Mar. 30, 1999

[54] PASSIVE-ACTIVE MOUNT

[75] Inventor: Jen-Houne Hannsen Su, Centreville, Va.

[73] Assignee: The United States of America as represented by the Secretary of the Navy, Washington, D.C.

[21] Appl. No.: 734,889

[22] Filed: Oct. 22, 1996

[51] Int. Cl.$^6$ ........................................................ F16F 9/04
[52] U.S. Cl. .................... 267/122; 188/379; 267/64.28; 267/140.14
[58] Field of Search .......................... 267/240.14, 64.24, 267/62.28, 122, 64.27; 188/374, 379, 380

[56] References Cited

U.S. PATENT DOCUMENTS

| | | | |
|---|---|---|---|
| 3,270,221 | 8/1966 | Shaffer | 310/51 |
| 3,836,098 | 9/1974 | Miyashita | 244/170.27 |
| 4,083,433 | 4/1978 | Geohegan et al. | 188/1 B |
| 4,470,121 | 9/1984 | Ebert | 364/508 |
| 4,481,967 | 11/1984 | Frick | 137/85 |
| 4,483,425 | 11/1984 | Newman | 188/378 |
| 4,492,246 | 1/1985 | Prescott et al. | 137/85 |
| 4,665,938 | 5/1987 | Brown et al. | 137/85 |
| 4,712,173 | 12/1987 | Ditzgerald et al. | 364/138 |
| 4,749,891 | 6/1988 | Sheng | 310/15 |
| 4,783,659 | 11/1988 | Frick | 340/870.37 |
| 4,822,009 | 4/1989 | Hirchenhain et al. | 267/140.1 |
| 4,869,477 | 9/1989 | Hoying et al. | 267/140.1 |
| 4,871,142 | 10/1989 | Demey, II | 248/632 |
| 4,887,788 | 12/1989 | Fischer et al. | 248/562 |
| 4,922,159 | 5/1990 | Phillips et al. | 318/128 |
| 5,131,611 | 7/1992 | Vollaro | 244/158 R |
| 5,181,452 | 1/1993 | Immega | 91/418 |
| 5,184,037 | 2/1993 | Kobayashi et al. | 310/26 |
| 5,197,328 | 3/1993 | Fritzgerald | 73/168 |
| 5,209,326 | 5/1993 | Harper | 188/378 |
| 5,333,819 | 8/1994 | Stetson, Jr. | 244/164 |
| 5,431,015 | 7/1995 | Hein et al. | 60/581 |
| 5,431,182 | 7/1995 | Brown | 137/85 |
| 5,456,047 | 10/1995 | Dorka | 52/167.4 |
| 5,510,660 | 4/1996 | Flatau et al. | 310/26 |

OTHER PUBLICATIONS

Jen-Houne Hannsen Su, "Robust Passive-Active Mounts for Machinery and Equipment," Proceedings of DETC '97, 1997 ASME Design Engineering Technical Conferences, Sep. 14-17, 1997, Sacramento, CA (nine pages).

Su, J. Hannsen et al, "Mechanisms of Localized Vibration Control in Complex Structures," Journal of Vibration and Acoustics, Jan. 96, V. 118, pp. 135-139.

*Primary Examiner*—Matthew C. Graham
*Attorney, Agent, or Firm*—Howard Kaiser

[57] ABSTRACT

The inventively advanced mount accommodates a conventional mount (such as an air mount) so as to include, at the mount's foundation-securing plate, at least one motion sensor and at least one vibratory actuator. Each sensor is correlated with an actuator. For each sensor-actuator pair, the electrical feedback loop includes generation by the sensor of a signal resulting from the local vibration of the foundation-securing plate, generation by a processor/controller of a signal derived from the sensor's signal, and exertion upon the foundation-securing plate by the sensor's paired actuator of a vibratory force commanded by the processor/controller's signal. Many preferred inventive embodiments collocate each sensor with its paired actuator and implement a conventional vibration suppression algorithm involving collocated velocity feedback. The inventive "passive-active" mount uniquely brings to bear, sequentially and complementarily, passive vibration control followed by active vibration control.

22 Claims, 7 Drawing Sheets

PASSIVE-ACTIVE MOUNT

The invention described herein may be manufactured and used by or for the Government of the United States of America for governmental purposes without the payment of any royalties thereon or therefor.

This application is related to copending U.S. patent application 08/734,890, filed 22 Oct. 1996, entitled "Passive-Active Vibration Isolation," inventor Jen-Houne Hannsen Su.

BACKGROUND OF THE INVENTION

This invention relates to methods, apparatuses and systems for isolating vibrations emanating from sources such as machinery, more particularly to those which implement a resilient element and which provide support for such sources.

It is environmentally desirable in many contexts to reduce transmission of vibrations to neighboring structure. For example, the U.S. Navy has an interest in attenuating the transmission, via connecting members to supporting structure, of unwanted vibrations from heavy machinery such as ship engines. Devices for reducing such transmission are generally known as vibration "isolators" because they serve to "isolate" the machine's vibration from contiguous structure. A vibration isolator is used to join one object to another and to restrict, to some degree, the transmission of vibration. Both passive and active vibration isolation systems have been known in the art.

Passive vibration isolators have conventionally involved a passive damping arrangement which provides a resilient element ("spring") along with a damping mechanism ("energy releaser"), and which serves as a support ("mount"), for vibrating machinery or other structure. Passive vibration isolation devices, alternatively referred to as "mounts" or "springs" or "spring mounts" in nomenclature, operate on the principle of low dynamic load transmissibility by a material having a resiliant property. Passive mounts are designated "passive" because their function is based upon their inherent property rather than on their ability to, in an "active" manner, react to an in-situ condition.

Passive mounts have been known to use any of various materials for the resilient element, such as rubber, plastic, metal and air. Elastomeric mounts rely primarily upon the resilience and the damping properties of rubber-like material for isolating vibrations. Mechanical spring mounts implement a helical or other metal spring configuration. Pneumatic mounts utlilize gas and an elastic material (such as reinforced rubber) as resilient elements in a bellows-like pneumatic spring assembly. A pneumatic mount or spring typically comprises a flexible member, which allows for motion, and a sealed pressure, container or vessel having one or more compartments, which provides for filling and releasing a gas.

Pneumatic springs are conventionally referred to as "air springs" because the gas is usually air. In conventional usage and as used herein the terms "air spring," "air mount" and "air spring mount" are used interchangeably, and in the context of these terms the word "air" means "gas" or "pneumatic," wherein "gas" or "pneumatic" refers to any gaseous substance.

In general comparison with other material-type passive mounts, air mounts are advantageous by virtue of their lighter weight greater energy-storage capacity per unit weight, and impedance tuning capability by means of air pressure adjustment. Due to their greater resilience, air mounts typically have lower resonant frequencies than have other passive mount types. Consequently, air mounts are, in general, more effective vibration isolators.

One important factor, however, for an air mount to be as effective as designed, and which has often been neglected, is the rigidity of the backing or the rigidity of the below-mount foundation. The stiffer the foundation, the better the performance of the isolation mount. An ideal foundation is a rigid base; however, for most passive vibration isolation applications, design and effectuation of a below-mount structure approximating a rigid base is impractical or cost-ineffective. Suffice it to say that there remains appreciable room for improvement in the majority of passive vibration isolation applications. The need is extant for a more effective yet feasible and economical approach to passive vibration isolation.

Active vibration isolation has more recently become known in the art. Basically, a sensor measures the structure's vibration, an actuator is coupled with the structure, and a feedback loop tends to reduce the unwanted motion. Typically, an output signal, proportional to a measurable motion (such as acceleration) of the structure, is produced by the sensor. Generally speaking, the actuator includes some type of reaction mass. A processor/controller processes the sensor-generated output signal so as to produce a control signal which drives the reaction mass, the actuator thereby producing a vibratory force, whereby the motion (e.g., acceleration) of the structure is reduced.

The three basic components of an active vibration isolation system are a motion sensor (e.g., a motion transducer), a processor/controller and a vibratory actuator. The sensor responds to vibratory motion by converting the vibratory motion into an electrical output signal that is functionally related to, e.g., proportional to, a parameter (e.g., displacement, velocity or acceleration) of the experienced motion. An accelerometer, for example, is a type of sensor wherein the output is a function of the acceleration input; the output is typically expressed in terms of voltage per unit of acceleration. The most common processor/controller is a "proportional-integral-derivative"-type ("PID"-type) controller, a kind of servomechanism, which proportionally scales, and integrates or differentiates, the sensor response. The actuator is essentially a device adapted to transmitting a vibratory force to a structure; such an actuator has been variously known and manifested as an inertia actuator, inertial actuator, proof mass actuator, shaker, vibration exciter and vibration generator; as used herein, the terms "actuator," "inertia actuator" and "vibratory actuator" are interchangeable and refer to any of these devices. The actuator generates a force, applied to the structure, based on the electrical output signal from the processor/controller.

SUMMARY OF THE INVENTION

In view of the foregoing, it is an object of the present invention to provide method, apparatus and system for highly effective vibration isolation on a realistic foundation.

It is another object of this invention to provide such method, apparatus and system which are practical and cost-effective for many applications.

A further object of this invention is to provide such method, apparatus and system which can efficiently and expediently adapt or incorporate existing vibration isolation applications.

According to the present invention, a conventional passive resilient mount having two securement members (e.g., the two opposite "backing" plates or "end" plates of an air mount) is adapted to include at least one actuator and at least one sensor (e.g., a velocity sensor or an accelerometer) at the mount's "isolatee-entity-securement" member. The mount's "isolatee-entity-securement" member is the mount's securement member which is attached to, or is attached with respect to, the "isolatee" entity. The "isolatee" entity is the entity from which the "isolated" entity's vibrations are sought to be isolated. Another securement member of the mount, viz., the "isolate-entity-securement" member, is attached to, or is attached with respect to, the "isolated" entity. For most inventive embodiments, the isolated entity is an object (such as a machine) and the isolatee entity is a "foundation" for the object.

In accordance with this invention, each actuator has a companion sensor. Each sensor responds to a local vibratory motion of the mount's isolatee-entity-securement member by sending a sensor feedback signal to a signal processor, which in turn sends a command signal to the sensor's companion actuator, which in turn exerts or imparts a vibratory control force or motion upon the mount's isolatee-entity-securement member. Each sensor continuously responds to the local vibration of the isolatee-entity-securement member, and the feedback loop inclusive of that sensor thus perpetuates. Each independent active vibration control subsystem includes a sensor and its corresponding actuator. The cumulative active vibration control system includes all of the individual active vibration control subsystems, each of which is uncomplicated.

When used herein adjectively to modify an inventive mount's securement member, the words "upper," "top," "lower" and "bottom" are terms of convenience which are intended to suggest structural and functional contradistinction rather than relative spatial positioning. Hence, in such contexts, the terms "upper" and "top" refer to isolated entity securement, i.e., securement of the mount with respect to the isolated entity, e.g., a vibrating object; the terms "lower" and "bottom" refer to isolatee entity securement, i.e., securement of the mount with respect to the isolatee entity, e.g., a foundation for the vibrating object.

Inventive embodiments employing plural sensors and plural actuators effectuate a "localized" vibration control approach rather than a "global" vibration control approach. Incorporated herein by reference is Su, J. Hannsen et al., "Mechanisms of Localized Vibration Control in Complex Structures," *Journal of Vibration and Acoustics*, January 1996, Volume 118, pages 135–139. This paper is instructive regarding localized vibration control, which involves stabilization in localized areas of a structure, as distinguished from global vibration control, which involves stabilization of the entire structure.

Most active vibration control research, particularly in space structures applications, has dealt with controlling vibration in a global sense; the controller stabilizes the entire structure. When the interest lies in stabilizing only certain localized areas of the structure, the control objective can be focused and actuators/sensors are generally required only in the control areas. This localized control approach can provide more effective vibration suppression in the control areas, and can require fewer actuators and sensors compared to global vibration control.

Deciding where to mount sensors and actuators is somewhat simpler in a localized vibration control problem than in a general vibration control problem. For localized vibration control, sensors-and actuators are usually located within the control areas, which comprise only a small portion of the entire structure.

This invention thus provides apparatus, system, and method for vibration isolation, especially for reducing transmission of vibration of an object to a foundation for said object.

An inventive vibration isolation system, for example, comprises a spring assembly and a feedback loop system. The spring assembly includes a top member, a bottom member and an interposed resilient member. The top member is for securing the spring assembly with respect to the object. The bottom member, typically a plate-type structure, is for securing the spring assembly with respect to the foundation. The feedback loop system includes a sensor, a PID-type controller and an actuator. The sensor is coupled with the bottom plate and generates a sensor signal which is a function of the vibration of the bottom plate. The PID-type controller generates a control signal which is a function of the sensor signal. The actuator is coupled with the bottom plate within the adjacent air chamber and is located proximate the sensor. The actuator generates a vibratory force which is in accordance with the control signal.

Many embodiments of this invention implement a plurality of sensors and a plurality of actuators. For such embodiments, the inventive feedback loop system includes a plurality of feedback loop subsystems. Each sensor is coupled with the bottom plate and generates a sensor output signal which is a function of the localized vibration of the bottom plate. The PID-type controller generates a plurality of control signals, each control signal being a function of its collocated sensor signal. Each actuator is coupled with the bottom plate within said adjacent air chamber, i.e., at the inside of the bottom plate in the space above the bottom plate. The sensors and actuators are in one-to-one correspondence whereby each actuator is located proximate the corresponding sensor and generates a vibratory force which is a function of the control signal which is a function of the sensor signal generated by the corresponding sensor. Each feedback loop subsystem includes a sensor and an actuator, correlatively paired.

For many inventive embodiments it is preferred that each sensor-to-actuator correlation include "collocation" of the sensor and the corresponding actuator; i.e., each collocated sensor-actuator pair is positioned in a kind of spatial and vectorial alignment, whereby the sensing of the sensor and the actuation of its corresponding actuator are approximately in the same direction. For some such inventive embodiments having at least two sensors and at least two actuators, all the collocational directions preferably are approximately parallel.

Some inventive embodiments manifesting collocational parallelism preferably manifest a kind of symmetry which may serve to optimize, perhaps even synergistically, the overall effectiveness of the individual localized active vibration control subsystems. For such embodiments, the spring assembly has an imaginary axis, approximately parallel to the collocational directions, of substantial symmetry through the bottom member and the top member; the actuators (and hence, the sensors) are distributed approximately symmetrically with respect to the imaginary axis. For example, an inventive air mount can avail the typically symmetrical configuration of a conventional air mount, wherein the top plate and the bottom plate each has a substantially circular shape and an imaginary center through which the imaginary axis passes.

For many preferred inventive embodiments, the inventive mount is an inventive air mount. The interposed resilient member is a bellows-like member having at least one air chamber, one air chamber being adjacent to the bottom plate. Typically, both the top and bottom members used for securing a conventional air mount are flat structures, e.g., plates. Generally, air mounts lend themselves to more advantageous inventive practice than do elastomeric mounts; virtually the entire upper surface of a conventional air mount's lower plate is available for inventive sensor-actuator implementation, whereas, for a conventional elastomeric mount, only the lower plate's upper surface's perimetric portion surrounding the axial elastomeric member is available for inventive sensor-actuator implementation.

The present invention essentially features a unique and efficacious combination of known passive vibration technology with known active vibration technology.

In particular, this invention features the coupling of one or more vibratory actuators with (e.g., attachment to or mounting upon) the bottom attachment plate of a conventional mount. This invention further features placement of one or more motion sensors (for sensing, e.g., velocity or acceleration) at the bottom attachment plate so that the sensors and actuators are correlated in pairs, each sensor-actuator pair having one sensor and one actuator in a functionally and situationally propinquant relationship.

The inventive mount is styled herein "passive-active" because, proceeding generally downward from the above-mount object to the below-mount foundation, the object's vibration is first reduced passively and then is further reduced actively.

In effect, active control is availed by this invention so as to increase the dynamic stiffness of the below-mount foundation. The impedance inherent in a realistic below-mount foundation falls short of the impedance inherent in an ideally rigid below-mount foundation. According to this invention, the impedence differential between foundation reality and foundation ideality is largely compensated for by providing one or more inertia actuators on the bottom plate (e.g., retainer plate, mounting plate, backing plate, or end plate) of the mount, for example inside an air mount on its bottom plate.

The present invention thus provides a more effective, yet practical and affordable, vibration isolation system. The electronic components are commercially available; the sensors, actuators and PID-type controllers appropriate for most inventive embodiments are "off-the-shelf" items which can be purchased at less than prohibitive costs. The sensors and actuators can be retrofitted in existing conventional mounts; alternatively, the inventive mount can be manufactured or assembled from scratch.

For many applications the inventive mount will afford superior performance in isolating vibrations of an above-mount structure from a realistic below-mount foundation; for some applications, however, the inventive mount can be used quite effectively for isolating vibrations of a below-mount foundation from an above-mount structure such as a piece of equipment.

For applications involving heavy machinery, such as may be found in factories or on U.S. Navy ships, a multiplicity of inventive mounts can be utilized. For a single piece of heavy machinery, vibration isolation effectiveness can be expected to increase in accordance with an increase in the number of inventive mounts that are used.

For applications involving stealth requirements, such as aboard U.S. Navy submarines, implementation of inventive mounts can succeed in meeting more stringent standards.

The active vibration control aspect of this invention serves to enhance the passive vibration control aspect of this invention. The present invention is thus "fail-safe" in a sense; in the event of inoperability of the inventive mount, for example due to power failure or electromechanical failure, the performance of the inventive mount degrades to that of the conventional passive mount.

This invention obviates the need to fortify, for isolation purposes, the existing below-mount foundation. The foundation will be less expensive, since its design will involve only considerations concerning load-carrying capacity (e.g., static strength/structural integrity). Vibration-related considerations will not need to be addressed in foundation design; such factors as fatigue life, vibration and noise will be controlled automatically by the advanced mount in accordance with this invention.

Furthermore, active control according to this invention serves to complement the deficiency of the passive control in the low frequency. Conventional passive mounts are characterized by low frequency enhancement; conventional passive mounts have inherent low frequency resonance, and consequently may be ineffective or may even cause enhancement of dynamic load transmission at low frequency. In inventive practice the low frequency disturbance enhancement due to the resonance frequency of the mounts should be more or less reduced, depending on the force output capacity of the actuators used for a given inventive embodiment.

Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein.

DETAILED DESCRIPTION OF THE INVENTION

Figure 1:
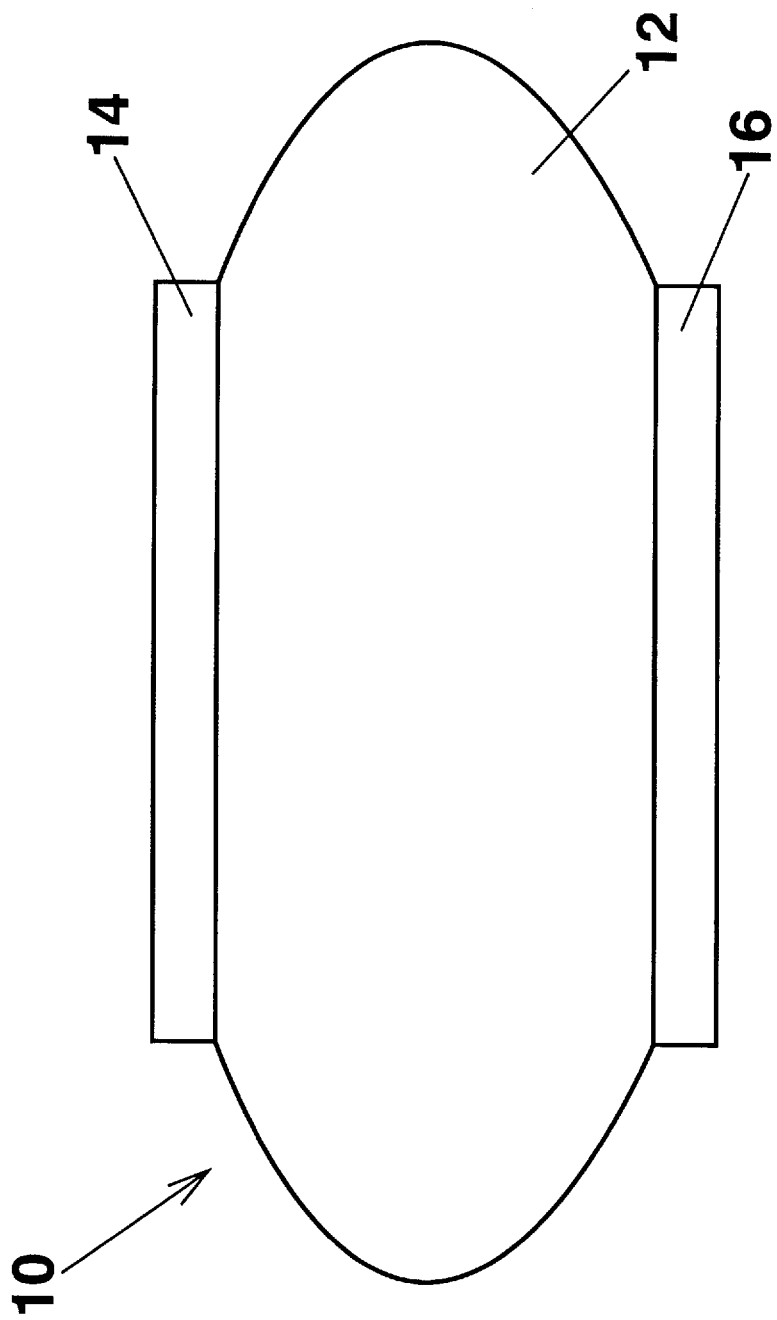
FIG. 1 is a diagrammatic cross-sectional elevational view of a typical conventional air mount.

Referring now to FIG. 1, conventional air spring assembly 10 is a single-convolute bellows-type assembly. Double-convolute and triple-convolute bellows-type air mounts are also commercially available, and similarly lend themselves to implementation in accordance with the teachings and principles of the present invention.

Conventional air spring assembly 10 includes singly convoluted flexible member 12, circular upper plate 14 and circular lower plate 16. Flexible member 12 is seen to have a convolution which annularly protrudes beyond the outside diameters of upper plate 14 and lower plate 16. Plates 14 and 16 are typically made of metal and provided with blind tapped holes (conventionally abbreviated "blind taps") and/ or protruding bolts, not shown, which serve to facilitate attachment to other structures. Blind tap holes are attachment provisions, recessed in plates 14 and 16, which are closed at the bottom (to prevent air loss) until a bolt or stud is inserted for attachment purposes.

For some air spring applications, plates 14 and 16 are the original end closures or retainers themselves which are attached to flexible member 12 and which provide an air-tight seal for air spring assembly 10; for other air spring applications, plates 14 and 16 are made to incorporate auxiliary plate-shaped members, coupled with the original retainer members, because the original retainer members are too small (e.g., diametrically) to effectuate those applications. Although the term "mounting plates" has conventionally been used to denote such auxiliary plates used for mounting purposes, the term "plate" as used herein refers to any air spring assembly end (or backing) plate which can be used for mounting purposes, including either an original retainer member or an auxiliary mounting member or some combination thereof.

Figure 2:
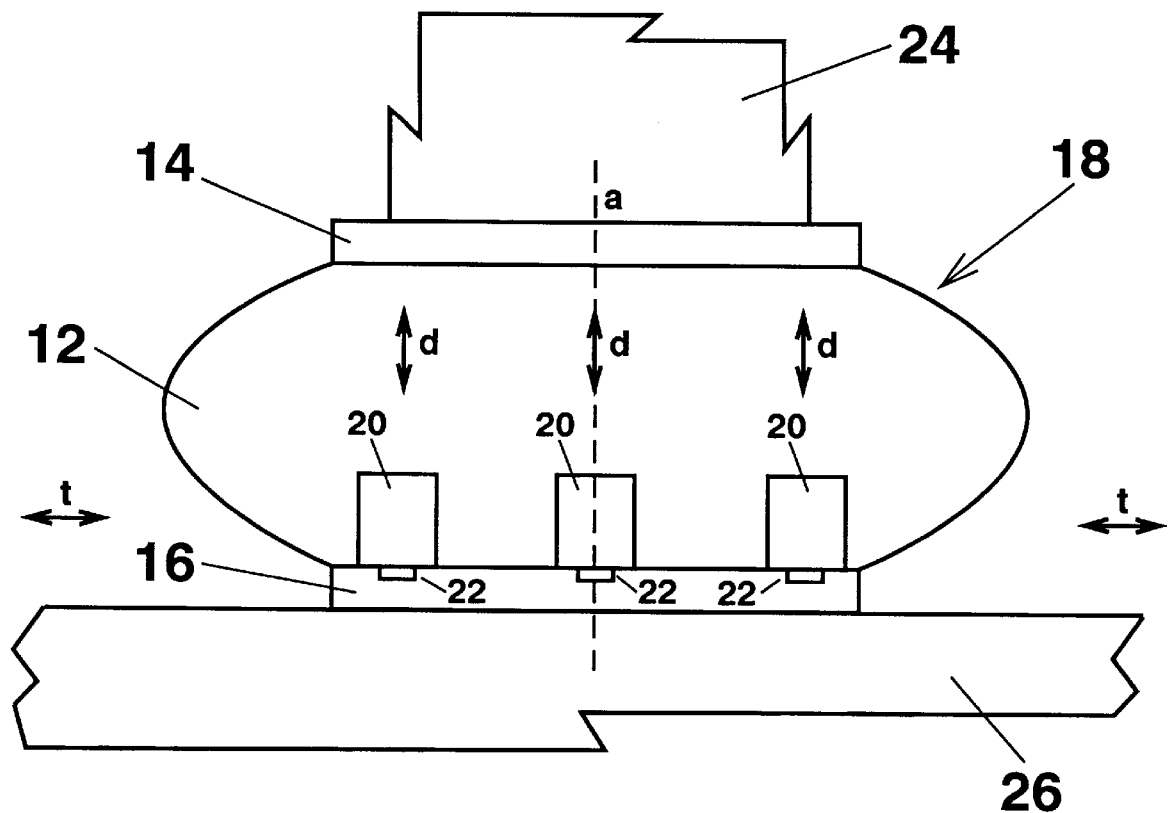
FIG. 2 is a diagrammatic view, similar to the view in FIG. 1, of an embodiment of a passive-active air mount in accordance with the present invention.
Figure 3:
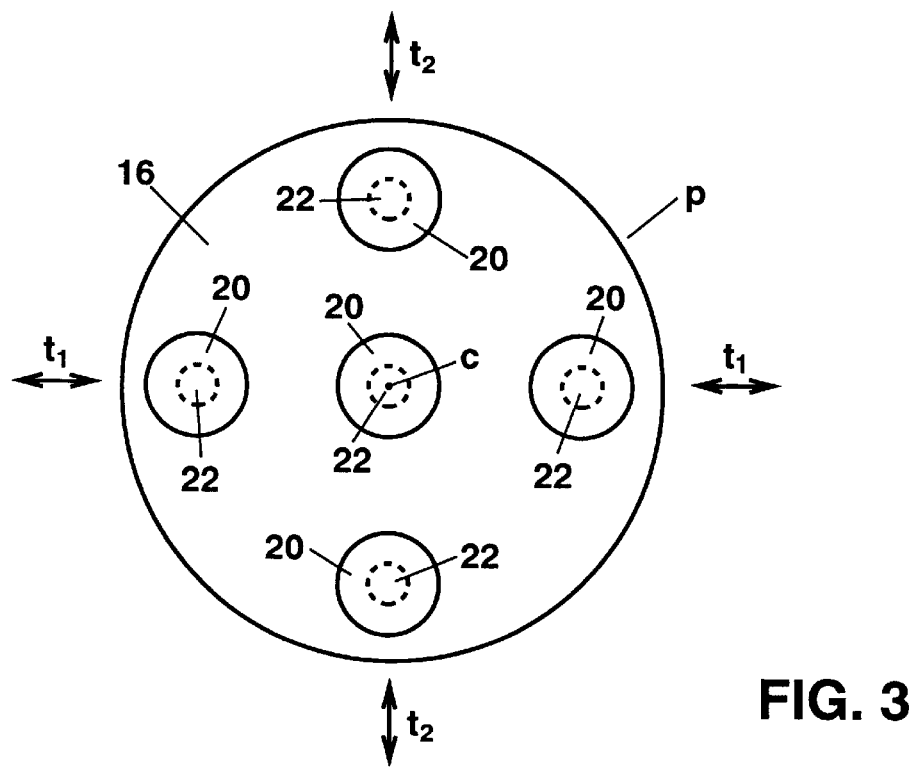
FIG. 3 is a diagrammatic top plan view of the sensors, actuators and bottom mounting plate shown in FIG. 2.

Reference now being made to FIG. 2 and FIG. 3, air spring assembly 10 has been inventively adapted to become inventive passive-active air spring assembly 18 which includes inertia actuators (or "shakers") 20 and velocity sensors 22. Inertia actuators 20 are mounted upon lower plate 16. Velocity sensors 22 are mounted in blind tapped holes in lower plate 16 at virtually the same locations. Actuators 20 and sensors 22 are thus paired one-to-one, i.e., one actuator 20 correspondingly with respect to one sensor 22. Inventive air spring assembly 18 is installed between machinery 24 and foundation 26.

In this example, the five sensors 22 and the five actuators 20 are collocatedly paired whereby for each collocation the sensing of the sensor 22 and the actuation of the actuator 20 are approximately in the same, generally vertical, direction indicated by directional arrow d. All five collocational directions d are approximately parallel. Inventive air spring assembly 18 can be envisioned to have a vertical axis of symmetry, represented by dashed line a, through plates 14 and 16. Imaginary axis a is approximately parallel to the collocational directions d and passes through center c of lower plate 16. Actuators 20 and co-located sensors 22 are seen to be symmetrically distributed with respect to center c. In the particular arrangement shown, one actuator 20 and one collocated sensor 22 are positioned at center c; four actuators 20 and four co-located sensors 22 are positioned nearer circumferential perimeter p in a symmetrical arrangement about center c.

In general inventive practice, the desired number and arrangement of actuators 20 depend on the size and shape of inventive air spring assembly 18 and the force output capacity of the actuators 20 selected.

Figure 4:
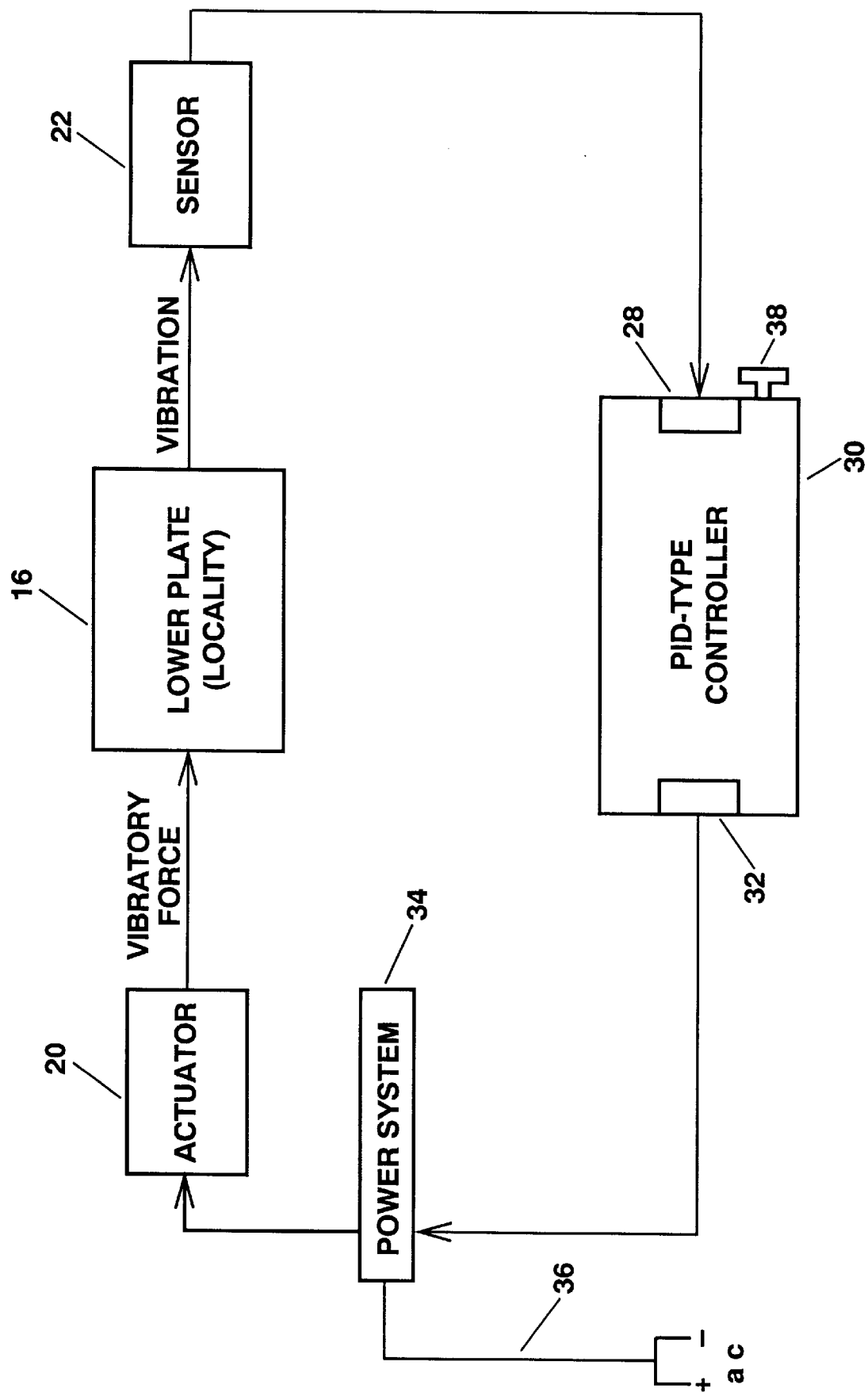
FIG. 4 is a simplified block diagram of each active subsystem control loop for an embodiment of a vibration isolation system in accordance with the present invention.

With reference to FIG. 4, for each feedback loop subsystem, a sensor is responsive to local vibration, the PID-type controller is responsive to that sensor's signal, and that sensor's companion actuator is responsive to the controller's signal. Sensor 22 is connected to an input channel 28 of PID-type controller 30. Sensor 22 responds to the localized vibration of lower plate 16 by sending a sensor signal to PID-type controller 30. Actuator 20 has a power system 34 which is connected to an output channel 32 of PID-type controller 30. PID-type controller 30 responds to the sensor signal by sending a control signal to actuator 20. Output channel 32 is connected to the power system 34 of the actuator 20 which is collocated with and companion to that particular sensor 22. Actuator 20 responds to the control signal of PID-type controller 30 by exerting a vibratory force upon the lower plate 16 locality.

Power cord 36 is "plugged into" an ac outlet, in a manner which is conventional for electronic equipment. Knob 38 of controller 30 is used for manually adjusting performance of the particular active control subsystem.

For example, an inventive vibration isolation system embodiment which includes an inventive air mount embodiment such as shown in FIG. 2 can be envisioned. Each one of five sensors 22 is connected to a corresponding one of five input channels 28, and the collocated one of five actuators 20 uses a power system 34 connected to all five output channels 32.

Controller 30 as shown has one control knob 38 which is for adjustment of the performance, based on frequency response, for one or more sensors of a particular inventive embodiment, e.g., sensors 22 of inventive air spring assembly 18. In inventive practice, the processor/controller can implement one or more control knobs or dials, manually operated for modulation purposes. Each knob 38 is tuned by the operator for performance, the performance being realized by the frequency response of the corresponding sensor or sensors 22. A frequency response indicator or display device for each sensor 22 can be designed and built into inventive air spring assembly 18, or can be otherwise conveniently located, e.g., below, next to or near inventive air spring assembly 18.

For many inventive embodiments, use of a single knob 38 for collective adjustment facilitates operation; it may be pragmatic that a single knob 38 be implemented for a plurality of subsystem loop or even for the entire group of subsystem loops for a given application, because the sacrifice in terms of tuning "fineness" is secondary to the gain in terms of ease of operation. Alternatively, each subsystem loop have corresponding thereto its own knob 38; for example, as regards inventive air spring assembly 18, controller 30 can be envisioned to have five knobs 38, each knob 38 corresponding to one subsystem loop inventive air spring assembly 18.

Sensors 22 are preferably velocity sensors 22 for many embodiments of this invention, wherein simple velocity feedback can thus be effectuated. Some inventive embodiments preferably employ sensors 22 which are accelerometers 22. Incorporated herein by reference are the following two United States patents, viz., to Geohegan, Jr. et al. at U.S. Pat. No. 4,083,433, and to Phillips et al. at U.S. Pat. No. 4,922,159. Geohegan, Jr. et al. are instructive regarding active vibration control based on sensing of vibration velocity, and Phillips et al. are instructive regarding active vibration control based on sensing of vibration acceleration.

Conventional passive mounts work on the principle of low dynamic load transmissibility by virtue of their resilient material property. They are designated "passive" because their function is based on their inherent property instead of their ability to react to the in-situ condition. A conventional passive vibration isolation mount, such as conventional air mount 10 shown FIG. 1, is not as effective as one might expect for a practical foundation having resonant frequencies within the bandwidth of interest.

Moreover, low frequency enhancement is a characteristic of conventional passive mounts; due to their inherent low frequency resonance, conventional passive mounts may be ineffective or may even cause enhancement of dynamic load transmission at low frequency. On the other hand, in the case of active load transmissibility control, a much higher local impedance is created by an actuator which can be very effective with proper controller design but which suffers from limited mechanical response at high frequency.

The present invention uniquely blends "the best of both worlds," so to speak, namely the passive vibration control realm and the active vibration control realm, so as to complement each other in terms of obviation of each other's weaknesses as well as overall vibration suppression effectiveness.

Figure 5:
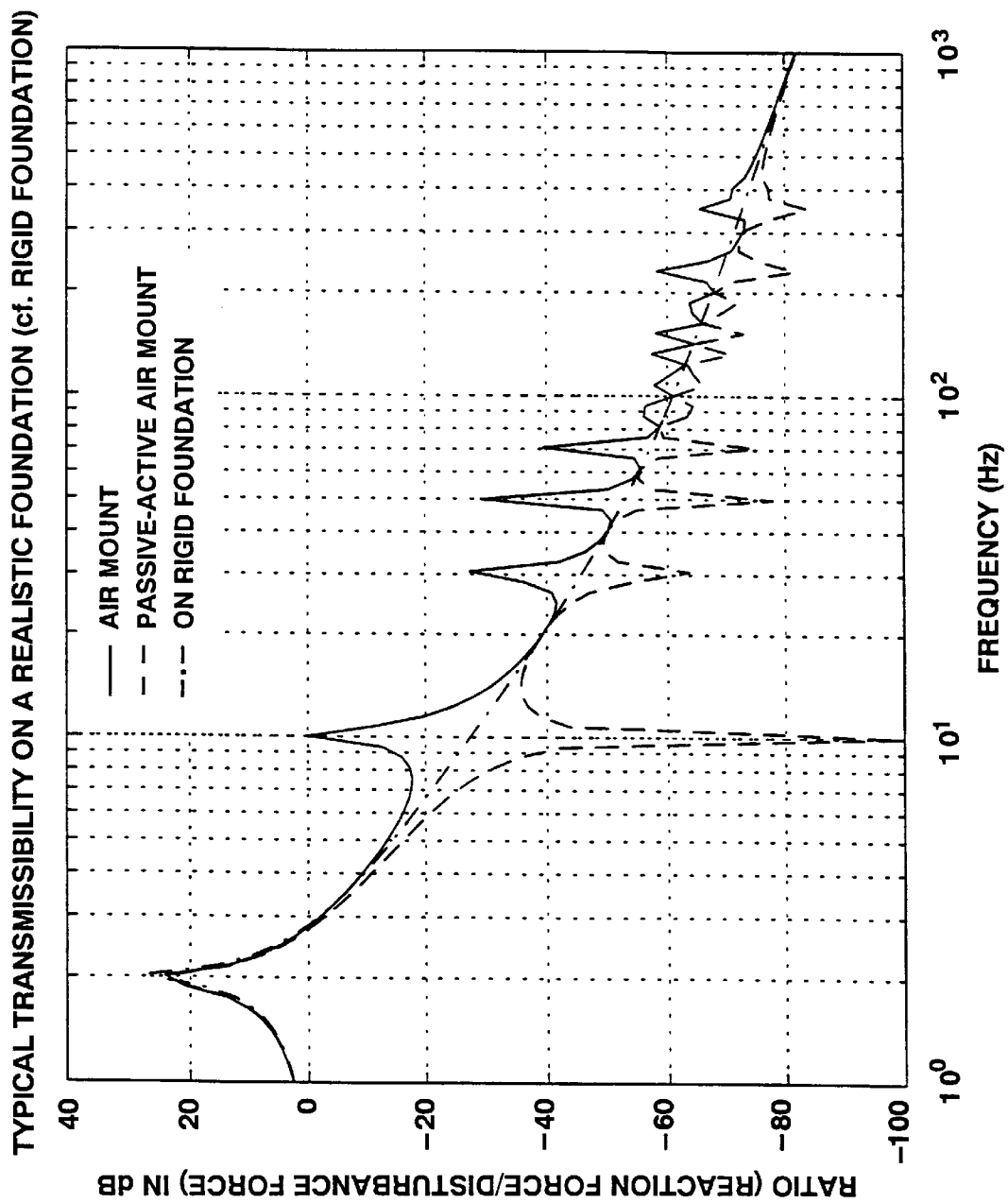
FIG. 5 is a conceptual illustration of performance of a conventional 2-Hz air mount in comparison with performance of an associated inventive passive-active air mount having simple velocity feedback implementation.

Reference is now being made to FIG. 5, which typifies performance of an inventive embodiment implementing collocated velocity feedback. It is seen that an inventive passive-active air mount, such as inventive air mount 18 shown in FIG. 2 wherein inertia actuators 20 are applied to lower attachment plate 16, not only can remedy problems associated with a realistic foundation but can also enhance performance so that it exceeds what performance would be on an ideal rigid foundation.

Many inventive embodiments preferably use collocated velocity feedback, which is the simplest and perhaps most widely used vibration suppression algorithm. The controller design for the inertia actuators pursuant to collocated velocity feedback is uncomplicated. The collocated velocity feedback design concept has universal application; it is applicable to any dynamic system.

Figure 6:
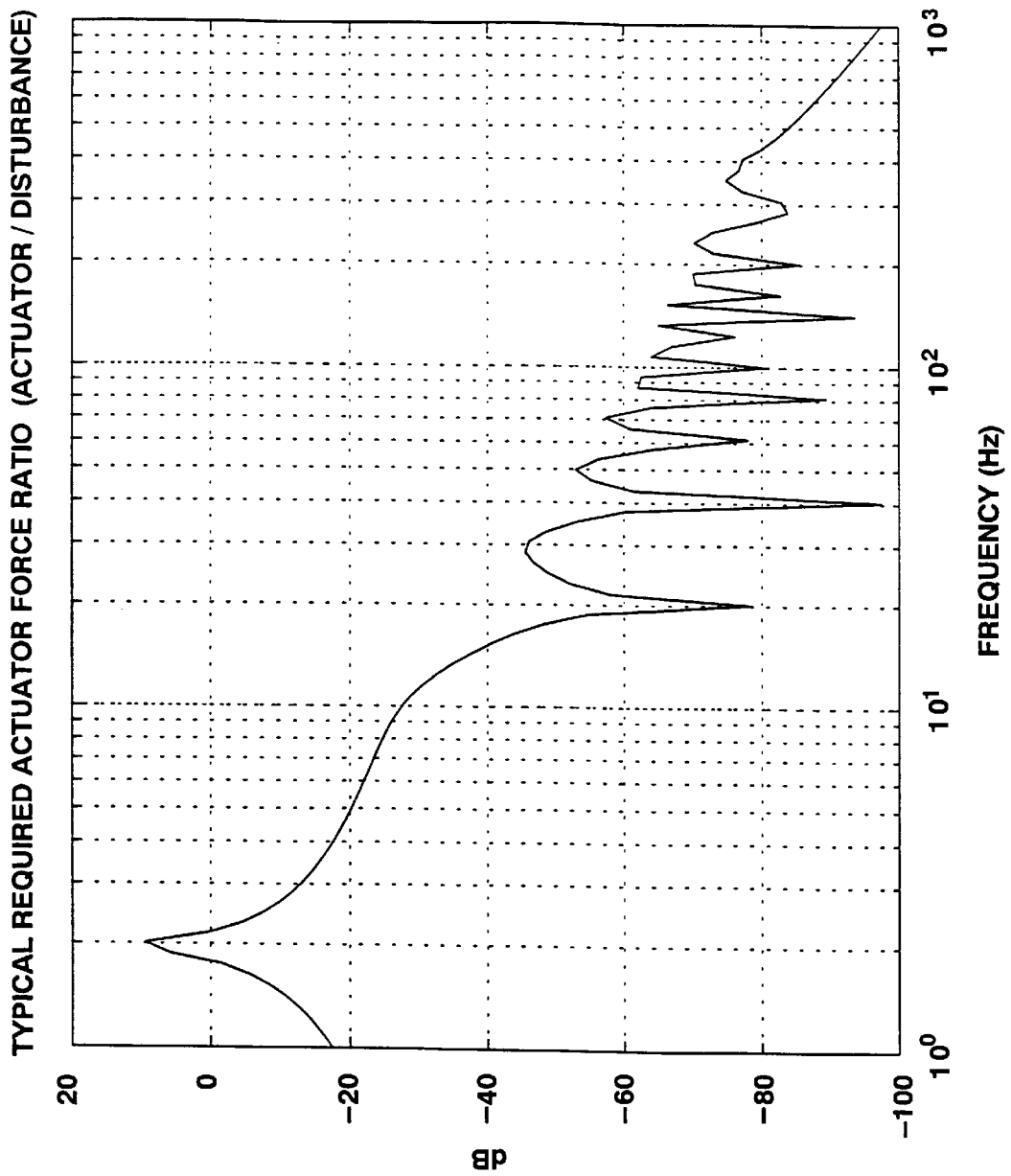
FIG. 6 is a conceptual illustration of the required actuator force for the inventive embodiment shown in FIG. 5.

Additionally, now referring to FIG. 6, it is seen that the required actuator force is typically undemanding for an inventive passive-active air mount such as exhibited in FIG. 5. An inventive passive-active air mount generally requires very little power and force capacity from the actuators—i.e., a small percentage of the disturbance force above the mount—in order to be effective for frequencies higher than the resonant frequency of the mount itself. Furthermore, for small-scale machinery or delicate equipment, the low frequency enhancement can also be reduced, if desired, since the required actuator output force capacity is within the hardware limitation.

Generally, when an inventive passive-active air mount is oriented vertically such as shown in FIG. 2, its passive vibration isolation mode will inherently provide better vibration isolation in transverse (i.e., horizontal) directions than in axial (i.e., vertical) directions, since the transverse spring rate normally will be lower than the axial spring rate. Hence, normally in inventive practice, lateral stability of the mounted object will be of greater concern than the degree or sufficiency of transverse vibration isolation.

Figure 7:
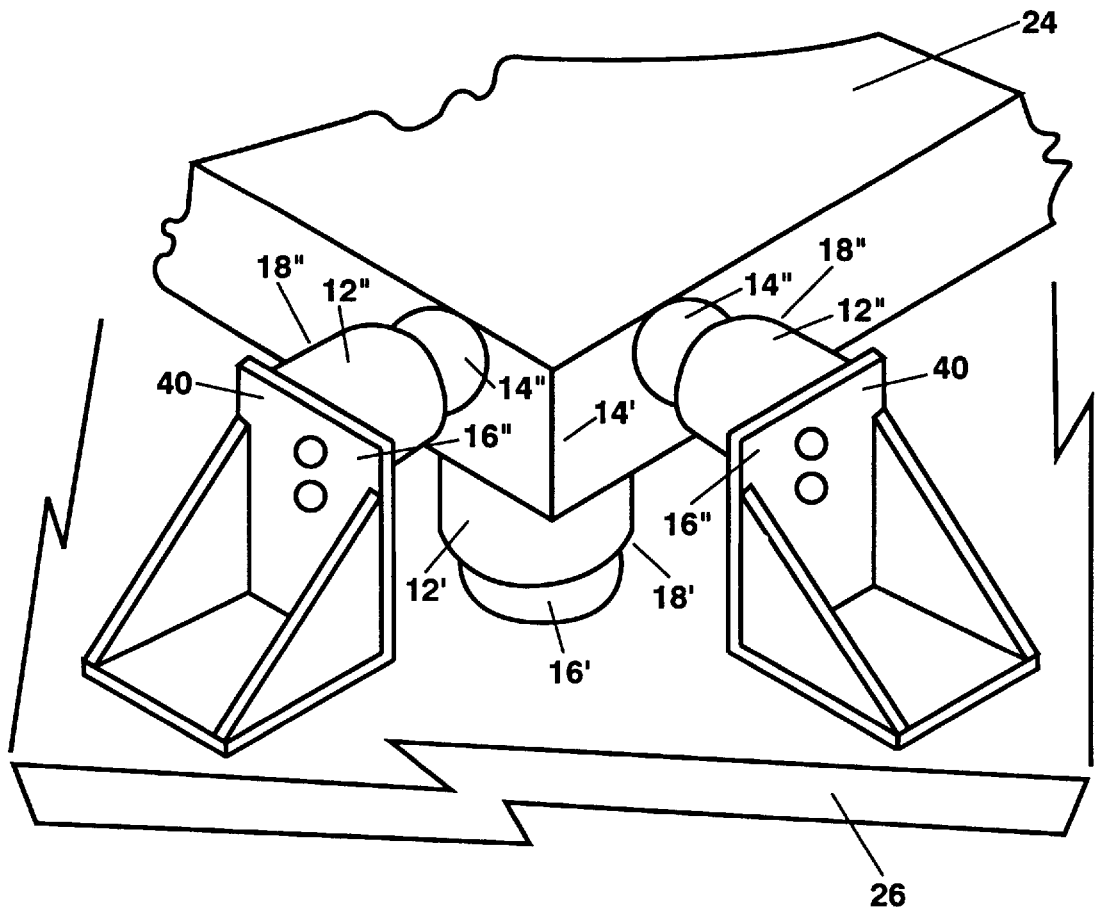
FIG. 7 is a partial diagrammatic perspective view of an embodiment, in accordance with the present invention, of passive-active isolation effectuated in different directions.

Nevertheless, for some inventive embodiments the requirements or specifications may be so stringent as to demand even better transverse vibration isolation than is intrinsically passively provided by the inventive air mount. If such is the case, for example, an inventive air mount can be oriented horizontally and situated between an object and a vertical restraining member. Referring to FIG. 7, each inventive air spring assembly 18' is oriented vertically and situated between machinery 24 and foundation 26, in a similar manner as shown FIG. 2; upper plate 14' is obstructedly viewed in FIG. 7. Each inventive air spring assembly 18" is oriented horizontally and situated between machinery 24 and bracket 40, which is attached both to foundation 26 and to lower plate 16" (obstructedly viewed in FIG. 7) of inventive air spring assembly 18".

As another example, vertically oriented inventive air spring assembly 18 can include one or more of the five collocated pairs of sensors 22 and actuators 20 whereby the collocatedly paired sensing and actuating functions are approximately in the same transverse direction indicated by directional arrow t. For instance, inventive air spring assembly 18 can be envisioned in FIG. 2 and FIG. 3 to have two opposite perimetric collocated sensor 22-actuator 20 pairs having the same first transverse direction $t_1$, two opposite perimetric collocated sensor 22/actuator 20 pairs having the same second transverse direction $t_2$ which is orthogonal with respect to first transverse direction $t_1$, and one central collocated sensor 22-actuator 20 pair having axial direction d which is orthogonal with respect to both first transverse direction $t_1$ and second transverse direction $t_2$.

Figure 8:
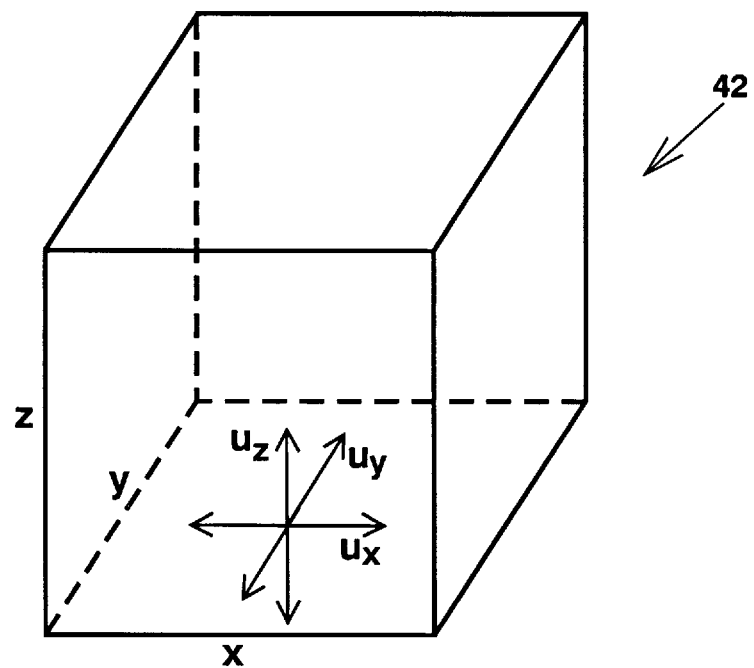
FIG. 8 is a diagrammatic perspective view of a triaxial sensor-actuator unit which can be used in accordance with the present invention.

Alternatively, with reference to FIG. 8, inventive air spring assembly 18 can be envisioned to include one or more triaxial sensor-actuator units 42. Each triaxial unit 42 has three collocated sensor 22-actuator 20 pairs oriented in three orthogonal directions, e.g., two transverse directions $u_X$ and $u_Y$ an axial direction $u_Z$; i.e., in Cartesian space, a first orthogonal direction is along or parallel to the x axis, a second orthogonal direction is along or parallel to the y axis, and a third orthogonal direction is along or parallel to the z axis. In the light of the teachings herein, practice of an inventive air spring assembly 18 so as to be instrumented with one or more such triaxial units 42 should be within the capability of the ordinarily skilled artisan. Triaxial sensors are commercially available; triaxial actuators have been custom-designed, e.g., for industrial plants, and can be specially ordered from manufacturers.

Figure 9:
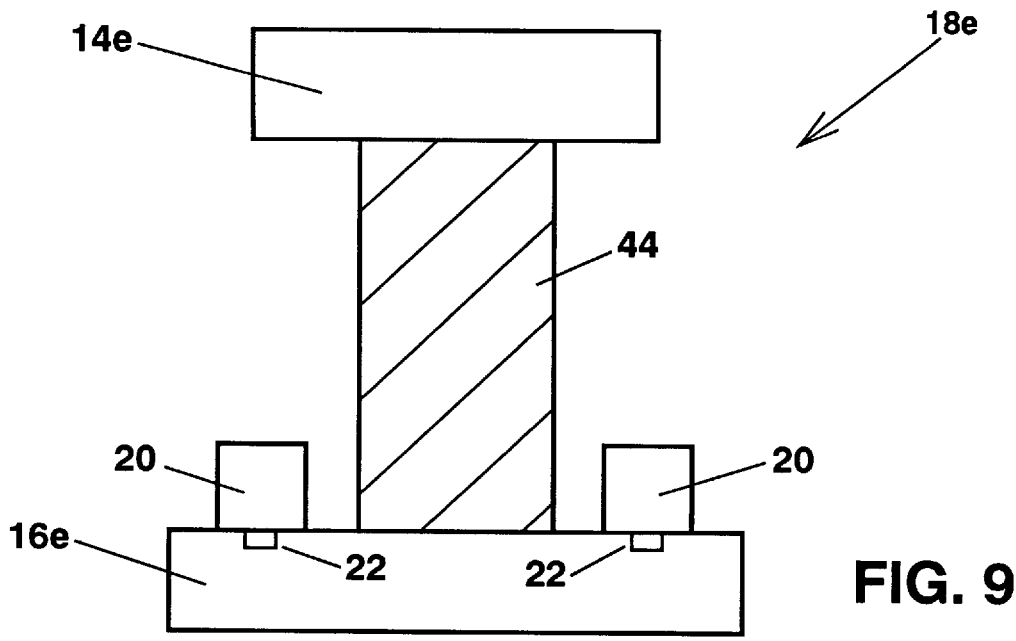
FIG. 9 is a diagrammatic view, similar to the view in FIG. 2, of an embodiment of a passive-active elastomeric mount in accordance with the present invention.
Figure 10:
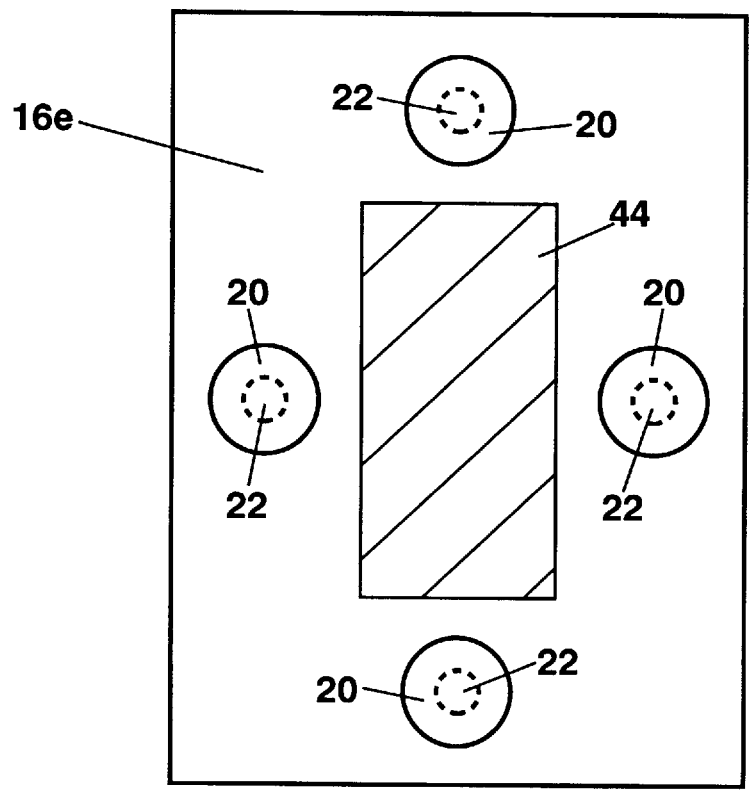
FIG. 10 is a diagrammatic top plan view of the sensors, actuators and bottom mounting plate shown in FIG. 9.

Reference now being made to FIG. 9 and FIG. 10, another type of resilient mount, viz., an elastomeric mount, has been inventively adapted so as to become inventive passive-active elastomeric mount 18e which includes actuators 20 and sensors 22 coupled with plate-like lower member 16e and distributed perimetrically in four collocated pairs. Elastomeric member 44 is centrally located. The inventive principles pertaining to inventive passive-active elastomeric mount 18e are analogous to those pertaining to inventive passive-active air mount 18 shown in FIG. 2 and FIG. 3. It will also be apparent to the ordinarily skilled artisan, in the light of the teachings herein, that many conventional mechanical spring mounts analogously admit of inventive implementation.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. A mount suitable for passive-active vibration isolation, said mount comprising:

an upper securement member, for securement with respect to an isolated body;

a lower securement member, for securement with respect to an isolatee body;

a resilient member which is characterized by low dynamic load transmissibility, said resilient member being for passive reduction of the transmission of vibration from said upper securement member to said lower securement member;

at least one sensor coupled with said lower securement member; and at least one actuator coupled with said lower securement member each said actuator near a corresponding said sensor;

wherein said at least one sensor and said at least one actuator are arranged in at least one collocational relationship;

wherein each said collocational relationship has associated therewith a corresponding said sensor, a corresponding said actuator and a corresponding region of said lower securement member;

wherein each said collocational relationship is characterized by approximate identity of said corresponding said sensor and said corresponding said actuator, said approximate identity being both in structural placement and functional direction; and wherein, in accordance with each said collocational relationship:

said corresponding said sensor is capable of generating a sensor signal which is representative of the local vibration in said corresponding said region and which is representable as a control signal; and said corresponding said actuator is capable of generating in said corresponding said region a vibratory force which:

is representative of said control signal which is representative of said sensor signal generated by said corresponding said sensor; and actively reduces the transmission through said corresponding said region of vibration which reaches said lower securement member after having been passively reduced by said resilient member.

2. A mount as in claim 1, wherein said vibratory force effectively increases the dynamic stiffness of said isolatee body.

3. A mount as in claim 1, wherein, in accordance with each said collocational relationship, said corresponding said sensor is selected from the group consisting of accelerometer and velocity sensor.

4. A mount as in claim 1, wherein said mount is an air mount, said upper securement member includes an upper plate, said lower securement member includes a lower plate, and said resilient member includes a flexible gas-containing member.

5. A mount as in claim 4, wherein, in accordance with each said collocational relationship, said corresponding said actuator is coupled with said lower plate so as to be situated inside said flexible gas-containing member.

6. A mount as in claim 4, wherein said top plate and said bottom plate each have a substantially circular shape and an imaginary center through which said imaginary axis passes.

7. A mount as in claim 1, wherein said mount is an elastomeric mount and said resilient member includes a solid elastomeric structure.

8. A mount as in claim 7, wherein said lower securement member has a surface portion which is outside said solid elastomeric structure, and wherein, in accordance with each said collocational relationship, said corresponding said actuator is coupled with said lower securement member at said surface portion.

9. A mount as in claim 1, wherein said lower securement member is a lower plate, said lower plate has at least one recess, and, in accordance with at least one said collocational relationship, said corresponding said sensor is coupled with said lower plate at least partially within a said recess.

10. A mount as in claim 1, wherein said lower securement member is a lower plate, said lower plate has an upper surface portion, and, in accordance with each said collocational relationship, said corresponding said actuator is coupled with said lower plate at said upper surface portion.

11. A mount as in claim 1, wherein:

said resilient member is characterized by low dynamic load transmissibility of vibration in a higher frequency bandwidth;

said vibration which reaches said lower securement member has not been passively reduced in a lower frequency bandwidth; and said vibratory force actively reduces the transmission through said corresponding said region of vibration in said lower frequency bandwidth.

12. A vibration isolator which is adapted for engagement with a processor/controller, said processor/controller being capable of generating a control signal, said vibration isolator comprising:

a spring assembly which includes a top member for securing said spring assembly with respect to an isolated entity, a bottom member for securing said spring assembly with a respect to an isolatee entity, and an interposed resilient member, wherein said resilient member has the property of Passively reducing vibration within a first frequency bandwith;

at least one sensor, each said sensor being coupled with said bottom member and being capable of generating a sensor signal which is in accordance with the vibration in a local zone of interest in said bottom member; and at least one actuator, each said actuator being coupled with said bottom member and being collocationally paired with one said sensor so as to share approximate coincidence with respect to both physical situation and operational direction, each said actuator being capable of generating, in said local zone of interest of said sensor with which said actuator is collocationally paired, a vibratory force which is in accordance with said control signal, wherein said control signal is in accordance with said sensor signal which is generated by said sensor with which said actuator is collocationally paired, wherein said vibratory force has the tendency of actively reducing vibration within a second frequency bandwith which differs from said first frequency bandwith.

13. A vibration isolator as in claim 12, wherein said passively reducing vibration and said actively reducing vibration occur in succession.

14. A vibration isolator as in claim 12, wherein each said sensor is selected from the group consisting of accelerometer and velocity sensor.

15. A vibration isolator as in claim 12, wherein said resilient member is a pneumatic member, and each said actuator is coupled with said bottom member within said pneumatic member.

16. A vibration isolator as in claim 12, wherein said resilient member is an elastomeric member, and each said actuator is coupled with said bottom member exteriorly with respect to said elastomeric member.

17. A vibration isolator as in claim 12, wherein said bottom member includes a bottom plate having a top side, and each said actuator is coupled with said bottom plate upon said top side.

18. A vibration isolator as in claim 12, wherein said processor/controller is a PID controller.

19. Method of making a mount suitable for passive-active vibration isolation, said method comprising:

providing a passive mount having an upper securement member, a lower securement member, and a resilient member which is characterized by low dynamic load transmissibility, said resilient member being for passive reduction of the transmission of vibration from said upper securement member to said lower securement member;

coupling at least one sensor with said lower securement member; and coupling at least one actuator with said lower securement members;

wherein said at least one sensor and said at least one actuator are arranged in at least one collocational relationship;

wherein each said collocational relationship has associated therewith a corresponding said sensor, a corresponding said actuator and a corresponding region of said lower securement member;

wherein each said collocational relationship is characterized by approximate identity of said corresponding said sensor and said corresponding said actuator, said approximate identity being both in structural placement and functional direction; and wherein, in accordance with each said collocational relationship:

said corresponding said sensor is capable of generating a sensor signal which is representative of the local vibration in said corresponding said region and which is representable as a control signal; and said corresponding said actuator is capable of generating in said corresponding said region a vibratory force which:

is representative of said control signal which is representative of said sensor signal generated by said corresponding said sensor; and actively reduces the transmission through said corresponding said region of vibration which reaches said lower securement member after having been passively reduced by said resilient member.

20. Method of making a mount as in claim 19, wherein said mount is an air mount, and said resilient member includes a flexible gas-containing member.

21. Method of making a mount as in claim 19, wherein said mount is an elastomeric mount, and said resilient member includes a solid elastomeric structure.

22. Method of making a mount as in claim 19, wherein:

said resilient member is characterized by low dynamic load transmissibility of vibration in a higher frequency bandwidth;

said vibration which reaches said lower securement member has not been passively reduced in a lower frequency bandwidth; and said vibratory force actively reduces the transmission through said corresponding said region of vibration in said lower frequency bandwidth.

* * * * *